US012777397B2

(12) United States Patent
Yan et al.

(10) Patent No.: US 12,777,397 B2
(45) Date of Patent: Oct. 27, 2026

(54) METHOD, DEVICE AND COMPUTER PROGRAM PRODUCT FOR WIRELESS COMMUNICATION

(71) Applicant: ZTE CORPORATION, Shenzhen (CN)

(72) Inventors: Xiaojian Yan, Shenzhen (CN); Jinguo Zhu, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 201 days.

(21) Appl. No.: 18/592,694

(22) Filed: Mar. 1, 2024

(65) Prior Publication Data

US 2024/0284292 A1 Aug. 22, 2024

Related U.S. Application Data

(63) Continuation of application No. PCT/CN2021/139299, filed on Dec. 17, 2021.

(51) Int. Cl.
*H04W 36/32* (2009.01)
*H04W 36/00* (2009.01)
*H04W 36/30* (2009.01)

(52) U.S. Cl.
CPC ..... *H04W 36/324* (2023.05); *H04W 36/0058* (2018.08); *H04W 36/0061* (2013.01); *H04W 36/30* (2013.01)

(58) Field of Classification Search
CPC ............... H04W 36/30; H04W 36/324; H04W 36/0058; H04W 36/0061
See application file for complete search history.

(56) References Cited

U.S. PATENT DOCUMENTS 10,764,813 B2 9/2020 Stauffer et al.
12,489,682 B2 * 12/2025 Xu ...................... H04L 41/0895
12,604,247 B2 * 4/2026 Natarajan ............ H04W 36/08
(Continued)

FOREIGN PATENT DOCUMENTS

CN 109417744 A 3/2019
CN 111543084 A 8/2020
(Continued)

OTHER PUBLICATIONS

International Search Report and Written Opinion for PCT Appl. No. PCT/CN2021/139299 mailed Sep. 2, 2022, (8 pages).
(Continued)

*Primary Examiner* — Melanie Jagannathan
(74) *Attorney, Agent, or Firm* — Foley & Lardner LLP

(57) ABSTRACT

Method, device and computer program product for wireless communication are provided. A method includes: receiving, by an access and mobility management node from a sensing network node, a first message and one or more identifiers of one or more target access network nodes; transmitting, by the access and mobility management node to the target access network nodes, the first message according to the one or more identifiers of target access network nodes to request the target access network nodes to generate sensing data, wherein the sensing data is transmitted to the sensing network node; and receiving, by the access and mobility management node from the sensing network node, a calculated result according to the sensing data.

17 Claims, 4 Drawing Sheets

(56) References Cited

U.S. PATENT DOCUMENTS

| | | | | |
|---|---|---|---|---|
| 12,615,615 | B2 * | 4/2026 | Singh | H04W 8/065 |
| 2019/0394746 | A1 | 12/2019 | Edge et al. | |
| 2020/0351692 | A1 * | 11/2020 | Beg | H04W 4/029 |
| 2021/0136674 | A1 | 5/2021 | Lee et al. | |
| 2021/0219211 | A1 | 7/2021 | Ke | |
| 2021/0243271 | A1 * | 8/2021 | Flynn, IV | G16Y 10/75 |
| 2021/0266859 | A1 | 8/2021 | Yu et al. | |
| 2021/0306235 | A1 | 9/2021 | Al-Dulaimi et al. | |
| 2021/0352575 | A1 * | 11/2021 | Chun | H04W 48/08 |
| 2023/0328683 | A1 * | 10/2023 | Zhang | H04W 4/40 455/456.1 |
| 2023/0370820 | A1 * | 11/2023 | Cheng | H04W 4/38 |
| 2024/0188023 | A1 * | 6/2024 | Kang | H04W 56/0015 |
| 2024/0196297 | A1 * | 6/2024 | Khirallah | H04W 36/0033 |
| 2024/0201318 | A1 * | 6/2024 | Xu | G01S 13/003 |
| 2024/0205719 | A1 * | 6/2024 | Chong | H04W 24/10 |
| 2024/0205817 | A1 * | 6/2024 | Ying | H04W 48/20 |
| 2024/0236911 | A1 * | 7/2024 | Li | H04W 24/10 |
| 2024/0310508 | A1 * | 9/2024 | Li | H04B 7/22 |
| 2024/0314821 | A1 * | 9/2024 | Yu | G01S 5/02 |
| 2024/0406689 | A1 * | 12/2024 | Liu | G01S 7/41 |
| 2024/0406690 | A1 * | 12/2024 | Liu | H04W 4/38 |
| 2025/0220770 | A1 * | 7/2025 | Xiang | H04W 76/27 |
| 2025/0240606 | A1 * | 7/2025 | Liu | G01S 13/86 |

FOREIGN PATENT DOCUMENTS

| | | | |
|---|---|---|---|
| JP | 2019-533959 | A | 11/2019 |
| JP | 2022-511597 | A | 2/2022 |
| JP | 2022-536716 | A | 8/2022 |
| WO | WO-2020/156498 | A1 | 8/2020 |

OTHER PUBLICATIONS

Mediatek Inc., Replacing "5G-(R)AN" by "NG-(R)AN", 3GPP TSG-SA WG2 Meeting #120, S2- 171895, Apr. 3, 2017, Busan Korea, (11 pages).

Extended European Search Report for EP Appl. No. 21967777.0, dated Dec. 10, 2024 (12 pages).

3rd Generation Partnership Project; Techincal Specification Group Services and System Aspects; 5G System Location Services (LCS) (Release 16), 3GPP TS 23.273 V1.0.0 (May 2019), 3 pages.

Notice of Grounds of Rejection for JP Appl. No. 2024-516700, dated Jun. 10, 2025 (with English translation, 10 pages).

Vivo, "Uu based Sensing", 3GPP TSG-WG SA2 Meeting #148e, S2-2108692, Nov. 2021, 13 pages.

Decision to Grant a Patent for JP Appl. No. 2024-516700, dated Sep. 9, 2025 (with English translation, 5 pages).

3rd Generation Partnership Project; Technical Specification Group Services and System Aspects; 5G System (5GS) Location Services (LCS); Stage 2 (Release 17), 3GPP TS 23.273 V17.2.0 (Sep. 2021), 99 pages.

Office Action for KR Appl. No. 10-2024-7008829, dated Jun. 29, 2026 (with English translation, 10 pages).

* cited by examiner

METHOD, DEVICE AND COMPUTER PROGRAM PRODUCT FOR WIRELESS COMMUNICATION

CROSS-REFERENCE TO RELATED PATENT APPLICATIONS

This application is a Continuation of PCT Application No. PCT/CN2021/139299, filed Dec. 17, 2021, incorporated herein by reference in its entirety.

TECHNICAL FIELD

This document is directed generally to wireless communications, and in particular to 5th generation (5G) communications.

BACKGROUND

Radio sensing refers to information retrieval from received radio signals which are impacted by the surrounding environment during the propagation. The ubiquitous radio sensing services are exemplified as the following:

- Autonomous vehicles/UAVs (Unmanned Aerial Vehicles): Autonomous vehicles/UAVs need to be able to avoid obstacles, select routes, detect hazards, and comply with traffic regulations. In addition to sensors equipped on the Autonomous vehicles/UAVs, wireless signals could be utilized to support or enhance these sensing functions.
- Environment mapping: Using the wireless signals for simultaneous sensing and mapping helps recognizing surrounding objects (landmarks). After the recognition of the environment, constructing the 2D (two-dimensional)/3D (three-dimensional) maps of the environment can further improve a positioning accuracy and enable environment related applications.
- Weather or air pollution monitoring: The quality of the received electromagnetic wave signal mirrors in different attenuation characteristics with changes in air humidity and carrier frequency, which can be used to replace traditional hygrometers or other sensors for weather detection.
- Real-time monitoring: The wireless signals could be utilized to facilitate an array of real-time monitoring related applications including intrusion detection.

SUMMARY

Introducing the sensing capability into a cellular wireless communication system has the benefit of using the same spectrum and infrastructure, especially for the industry having both communication and sensing demands as below.

The intelligent transportation is developing faster with involving the new cellular communications and sensing/sensor technologies. The automatic diving, the real time dynamic 3D map generation and distribution, and the safety supervision have more requirements on wireless communications, e.g., high data rate to support the dynamic 3D map downloading, and the sensing/sensor capabilities to generate the dynamic 3D map.

It is foreseeable that over 90% of all vehicles will have a 4G ($4^{th}$ generation)/5G communication module and 70% vehicles will have V2X (vehicle-to-everything) communication module in the future. On the other hand, Vehicle-Road collaboration is a future trend and accelerates the roadside intelligent transport system (ITS) facility deployment, e.g., the sensors and cameras. However, the wireless communication and sensing now are decoupled without cooperation. Considering the wireless communication base stations have been arranged along the roadside as the infrastructure, a cellular network supporting the sensing capability is able to reduce the cost by sharing the base station sites and to increase the practicability and flexibility for the intelligent transportation.

Furthermore, the UAV industry has a similar demand on harmonizing wireless communications and sensing. A large-scale UAV commercial business requires realizing a low-altitude air traffic management and supervision. In addition, the real time sensing capability plays an important role in complying with the legal regulation. The 5GS (5G system) has been enhanced to enable UAV identification and tracking and to support UAV commands and control functions. Both the communication and sensing capabilities are required by UAV applications, remote control, UAV traffic management and so on. Accordingly, the 5GS providing the sensing capability could bring benefit for the UAV business.

Moreover, the railway intrusion detection is another field having a demand on harmonizing wireless communications and sensing to improve operational efficiency and public safety.

To enable the sensing capability in the (5G) communication network, the (5G) network architecture may need to be modified.

The present disclosure relates to methods, devices, and computer program products for wireless communication, which allow a sensing network node to acquire sensing data from base stations.

One aspect of the present disclosure relates to a wireless communication method. In an embodiment, the wireless communication method includes: receiving, by an access and mobility management node from a sensing network node, a first message and one or more identifiers of one or more target access network nodes; transmitting, by the access and mobility management node to the target access network nodes, the first message according to the one or more identifiers of target access network nodes to request the target access network nodes to generate sensing data, wherein the sensing data is transmitted to the sensing network node; and receiving, by the access and mobility management node from the sensing network node, a calculated result according to the sensing data.

Another aspect of the present disclosure relates to a wireless communication method. In an embodiment, the wireless communication method includes: transmitting, by a sensing network node to an access and mobility management node, a first message and one or more identifiers of one or more target access network nodes, to request the access and mobility management node to forward the first message to the target access network nodes according to the one or more identifiers, to request the target access network nodes to generate sensing data; receiving, by the sensing network node, the sensing data; and transmitting, by the sensing network node to the access and mobility management node, a calculated result according to the sensing data.

Another aspect of the present disclosure relates to a wireless communication method. In an embodiment, the wireless communication method includes: receiving, by an access network node from an access and mobility management node, a first message; performing, by the access network node, measurements to generate sensing data according to the first message; and transmitting, by the access network node, the sensing data to a sensing network node to allow the sensing network node to generate a calculated result according to the sensing data.

Another aspect of the present disclosure relates to a wireless communication method. In an embodiment, the wireless communication method includes: transmitting, by a network exposure node to an access and mobility management node, a first sensing request, to allow the access and mobility management node to trigger a sensing network node to acquire sensing data from one or more target access network nodes; and receiving, by the network exposure node from the access and mobility management node, a calculated result according to the sensing data.

Another aspect of the present disclosure relates to a wireless communication node. In an embodiment, the wireless communication node includes a communication unit and a processor. The processor is configured to receive, from a sensing network node, a first message and one or more identifiers of one or more target access network nodes; transmit, to the target access network nodes, the first message according to the one or more identifiers of target access network nodes to request the target access network nodes to generate sensing data, wherein the sensing data is transmitted to the sensing network node; and receive, from the sensing network node, a calculated result according to the sensing data.

Another aspect of the present disclosure relates to a wireless communication node. In an embodiment, the wireless communication node includes a communication unit and a processor. The processor is configured to transmit, to an access and mobility management node, a first message and one or more identifiers of one or more target access network nodes, to request the access and mobility management node to forward the first message to the target access network nodes according to the one or more identifiers, to request the target access network nodes to generate sensing data; receive the sensing data; and transmit, to the access and mobility management node, a calculated result according to the sensing data.

Another aspect of the present disclosure relates to a wireless communication node. In an embodiment, the wireless communication node includes a communication unit and a processor. The processor is configured to receive, from an access and mobility management node, a first message; perform measurements to generate sensing data according to the first message; and transmit the sensing data to a sensing network node to allow the sensing network node to generate a calculated result according to the sensing data.

Another aspect of the present disclosure relates to a wireless communication node. In an embodiment, the wireless communication node includes a communication unit and a processor. The processor is configured to transmit, to an access and mobility management node, a first sensing request, to allow the access and mobility management node to trigger a sensing network node to acquire sensing data from one or more target access network nodes; and receive, from the access and mobility management node, a calculated result according to the sensing data.

Various embodiments may advantageously implement the following features:

Preferably or in some embodiments, the sensing data is transmitted to the sensing network node via one or more tunnels between the sensing network node and each of the target access network nodes.

Preferably or in some embodiments, the first message comprises address information of the sensing network node.

Preferably or in some embodiments, the access and mobility management node is configured to receive address information of the target access network nodes from the target access network nodes and transmit the address information of the target access network nodes to the sensing network node, wherein the sensing data is transmitted to the sensing network node via one or more tunnels based on the address information of the sensing network node and address information of the target access network nodes.

Preferably or in some embodiments, the access and mobility management node is configured to transmit the first message with a routing identifier of the sensing network node to the target access network nodes, receive the address information of the target access network nodes with the routing identifier, and transmit the address information of the target access network nodes to the sensing network node according to the routing identifier.

Preferably or in some embodiments, the address information of the sensing network node comprises an Internet Protocol, IP, address and an IP port.

Preferably or in some embodiments, the access and mobility management node is configured to receive the sensing data and transmit the sensing data to the sensing network node.

Preferably or in some embodiments, the access and mobility management node is configured to transmit the first message with a routing identifier of the sensing network node to the target access network nodes, receive the sensing data with the routing identifier, and transmit the sensing data to the sensing network node according to the routing identifier.

Preferably or in some embodiments, the access and mobility management node is configured to receive a sensing request comprising a tracking area identity, TAI, list.

Preferably or in some embodiments, the access and mobility management node is configured to select the sensing network node according to a tracking area identity, TAI list and transmit the TAI list to the sensing network node.

Preferably or in some embodiments, the access and mobility management node is configured to transmit to the sensing network node at least one of a sensing quality of service, QoS, or one or more object types.

Preferably or in some embodiments, the access and mobility management node is configured to transmit information of one or more unavailable access network nodes to the sensing network node.

Preferably or in some embodiments, the access and mobility management node is configured to transmit the calculated result to a network exposure node or an application node.

Preferably or in some embodiments, the sensing network node is configured to receive address information of the target access network nodes from the access and mobility management node, and receive the sensing data via one or more tunnels based on the address information of the sensing network node and address information of the target access network nodes.

Preferably or in some embodiments, the sensing network node is configured to receive a tracking area identity, TAI, list from the access and mobility management node, and determine the one or more identifiers of target access network nodes according to the TAI list.

Preferably or in some embodiments, the sensing network node is configured to receive, from the access and mobility management node, at least one of a sensing quality of service, QoS, or one or more object types.

Preferably or in some embodiments, the sensing network node is configured to receive information of one or more unavailable access network nodes from the access and mobility management node.

Preferably or in some embodiments, the access network node is configured to transmit address information of the access network node to the sensing network node via the access and mobility management node.

Preferably or in some embodiments, the sensing data is transmitted to the sensing network node via a tunnel based on the address information of the sensing network node and address information of the target access network node.

Preferably or in some embodiments, the access network node is configured to receive the first message with a routing identifier of the sensing network node and transmit the address information of the access network node with the routing identifier, to allow the access and mobility management node to transmit the address information of the target access network nodes to the sensing network node according to the routing identifier.

Preferably or in some embodiments, the access network node is configured to transmit the sensing data to the sensing network node via the access and mobility management node.

Preferably or in some embodiments, the access network node is configured to receive the first message with a routing identifier of the sensing network node and transmit the sensing data with the routing identifier to the access and mobility management node, to allow the access and mobility management node to transmit the sensing data to the sensing network node according to the routing identifier.

Preferably or in some embodiments, the network exposure node is configured to receive a second sensing request from an application node and determine whether the second sensing request from the application node is authorized.

Preferably or in some embodiments, the second sensing request comprises a target area, and the network exposure node is configured to map the target area to a tracking area identity, TAI, list.

Preferably or in some embodiments, the second sensing request comprises at least one of a sensing quality of service, QoS, or one or more object types.

Preferably or in some embodiments, the network exposure node is configured to select the access and mobility management node according to a tracking area identity, TAI, list and transmit the first sensing request comprising the TAI list to the selected access and mobility management node.

The present disclosure relates to a computer program product comprising a computer-readable program medium code stored thereupon, the code, when executed by a processor, causing the processor to implement a wireless communication method recited in any one of foregoing methods.

The example embodiments disclosed herein are directed to providing features that will become readily apparent by reference to the following description when taken in conjunction with the accompany drawings. In accordance with various embodiments, example systems, methods, devices and computer program products are disclosed herein. It is understood, however, that these embodiments are presented by way of example and not limitation, and it will be apparent to those of ordinary skill in the art who read the present disclosure that various modifications to the disclosed embodiments can be made while remaining within the scope of the present disclosure.

Thus, the present disclosure is not limited to the example embodiments and applications described and illustrated herein. Additionally, the specific order and/or hierarchy of steps in the methods disclosed herein are merely example approaches. Based upon design preferences, the specific order or hierarchy of steps of the disclosed methods or processes can be re-arranged while remaining within the scope of the present disclosure. Thus, those of ordinary skill in the art will understand that the methods and techniques disclosed herein present various steps or acts in a sample order, and the present disclosure is not limited to the specific order or hierarchy presented unless expressly stated otherwise.

The above and other aspects and their implementations are described in greater detail in the drawings, the descriptions, and the claims.

DETAILED DESCRIPTION

Figure 1:
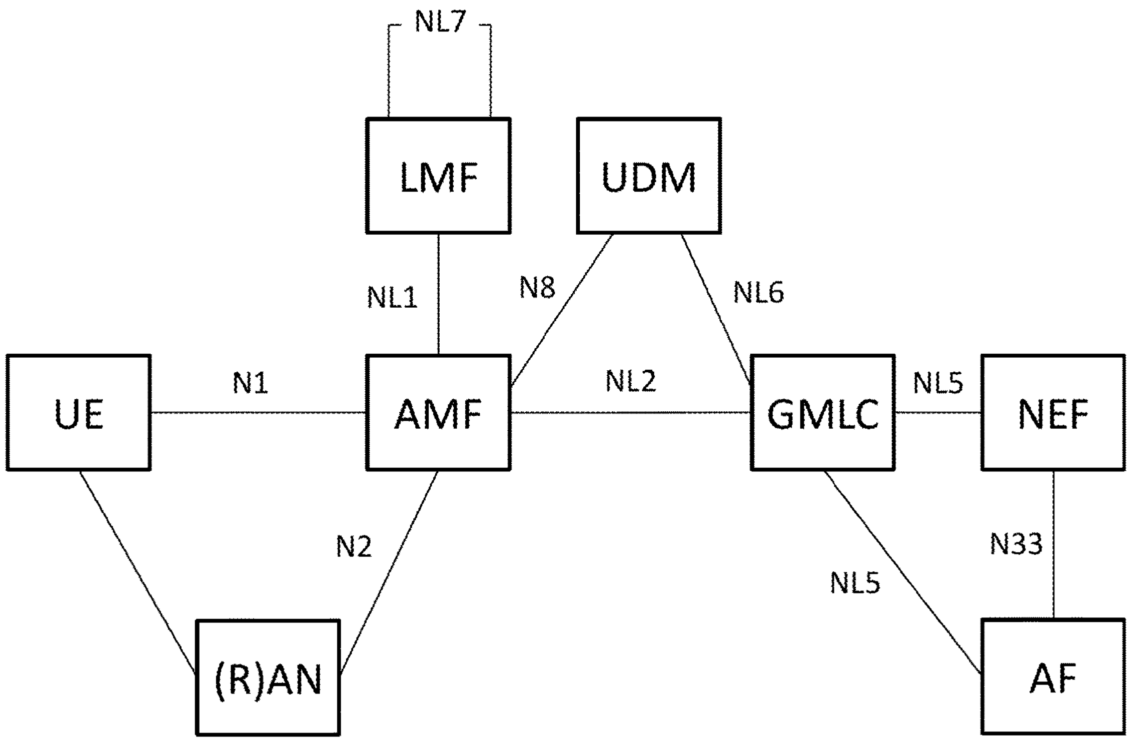
FIG. 1 shows a schematic diagram of a network according to an embodiment of the present disclosure.

FIG. 1 shows a schematic diagram of a network (architecture) according to an embodiment of the present disclosure. The network shown in FIG. 1 may be in a 5G system (5GS). The positioning for each UE may be supported in the 5GS. FIG. 1 shows the architecture for a (5GS) location service for a non-roaming user equipment (UE).

In FIG. 1, the network comprises the following network functions/entities:

1) UE (User Equipment):

The UE obtains location measurements and sends the measurements to an LMF (Location Management Function), to compute a location.

2) (R)AN ((Radio) Access Network):

The (R)AN is involved in handling of various positioning procedures such as the positioning of a target UE, the provision of location related information not associated with a particular target UE and the transmission of positioning messages between an AMF (Access and Mobility Management Function) or LMF and the target UE.

3) AMF (Access and Mobility Management Function):

The AMF contains functionalities for managing positioning for the target UE for all types of location requests.

4) LMF (Location Management Function):

The LMF manages the overall coordination and scheduling of resources required for the location of a UE that is registered with or accessing the 5G core network (CN). The LMF may also calculate or verify a final location and a velocity estimation of a UE and estimate the achieved accuracy.

5) UDM (Unified Data Management)

The UDM contains location service (LCS) subscribers, LCS privacy profiles and routing information.

6) GMLC (Gateway Mobile Location Centre)

The GMLC is the first node an external LCS client accesses in a public land mobile network (PLMN). AFs and NFs (Network Functions) may access the GMLC directly or via a NEF. The GMLC may request the routing information and/or the target UE privacy information from the UDM.

After checking the authorization of an external LCS Client or the AF and verifying the target UE privacy, the GMLC forwards a location request to the serving AMF.

7) NEF (Network Exposure Function):

The NEF provides a means of accessing location services by an external AF or an internal AF.

8) AF (Application Function)

The AF requests the location for a UE.

Figure 2:
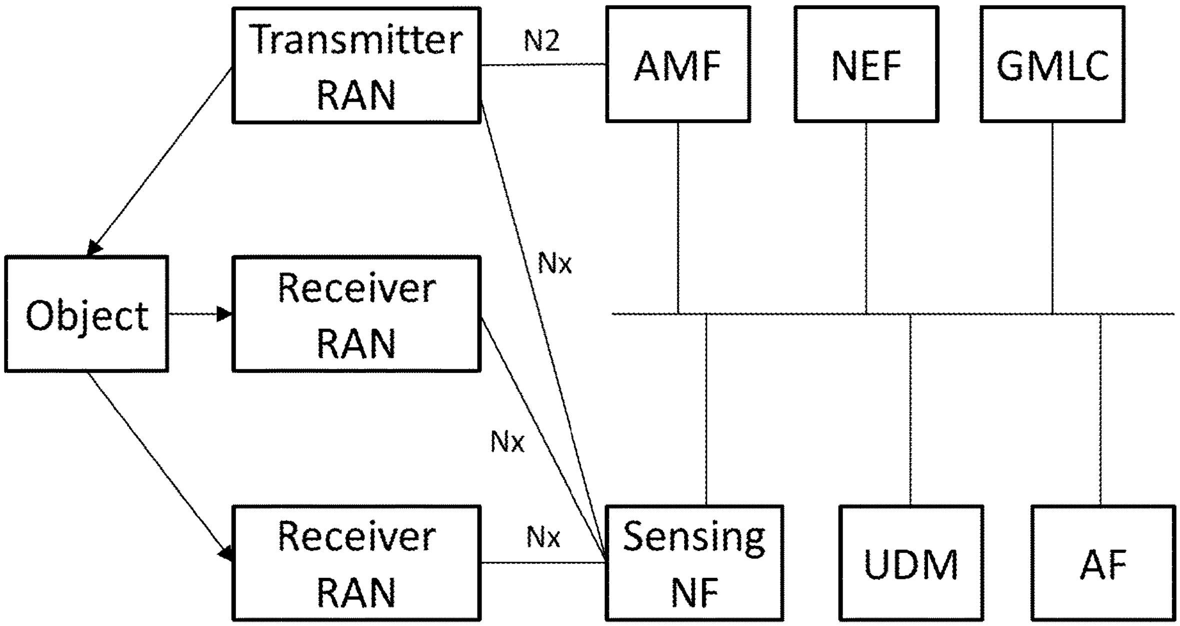
FIG. 2 shows a schematic diagram of a sensing architecture according to an embodiment of the present disclosure.

FIG. 2 shows a schematic diagram of a sensing architecture according to an embodiment of the present disclosure. To enhance a 5GC to support sensing, the sensing architecture shown in FIG. 2 may be used in the 5GC with at least one of the following aspects:

i) The AF and/or NEF sends a sensing request to the Sensing NF (Sensing Network Function) via the AMF.

ii) The Sensing NF collects sensing data from the Transmitter RAN and the multiple Receiver RANs and calculates the sensing result.

iii) The collection of sensing data from the RANs is performed via Nx tunnels between the RANs and the Sensing NF or via N2 interfaces between the RANs and the AMF.

In some embodiments, the Sensing NF may have at least a part of the capabilities of the LMF. In some embodiments, the Sensing NF can be collocated with an LMF or other NF.

Figure 3:
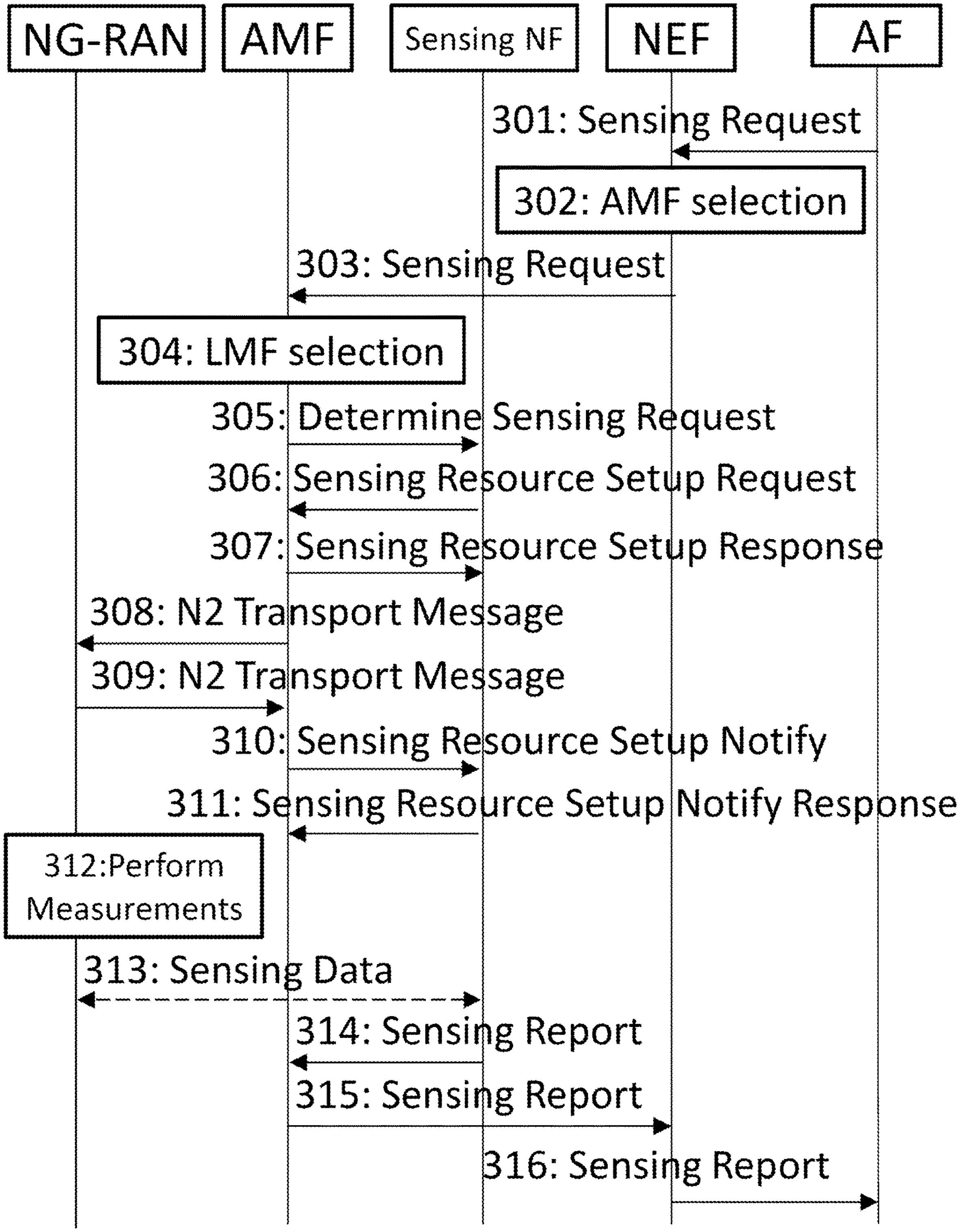
FIG. 3 shows a schematic diagram of a process according to an embodiment of the present disclosure.

FIG. 3 shows a schematic diagram of a process according to an embodiment of the present disclosure. In FIG. 3, the Sensing NF collects the sensing data from the NG-RAN (e.g., next-generation RAN) over the Nx tunnel. Specifically, the process comprises the following steps:

Step 301: In order to be aware of objects (e.g., non-UE objects) within an area, an external AF sends a Sensing Request for the area to the NEF. The Sensing Request includes the target area (e.g., a geographical area) and may further include at least one of a sensing quality of service (QOS), one or more object types (e.g., dynamic object or static object) and/or other attributes for sensing requirements.

In an embodiment of the AF being an internal AF, the internal AF may select the AMF and send the Sensing Request to the AMF directly. In this embodiment, the Sensing Request includes a target tracking area identity (TAI) list.

Step 302: The NEF determines whether the AF or the Sensing Request from the AF is authorized and maps the geographical area into a TAI list. If the AF or the Sensing Request from the AF is authorized, the NEF selects an AMF that serves the mapped TAI list (e.g., serves the tracking areas in the TAI list).

Step 303: The NEF sends the Sensing Request comprising the TAI list to the selected AMF.

Step 304: The AMF selects a Sensing NF based on the TAI list. In an embodiment, the selection may be performed by using a network repository function (NRF) query.

Step 305: The AMF sends a Determine Sensing Request towards the Sensing NF, to request the sensing data corresponding to the TAI list. The AMF includes the TAI list in the Determine Sensing Request. In an embodiment, the AMF further includes, if available, at least one of the sensing quality of service (QOS), the one or more object types (e.g., dynamic object or static object) and/or other attributes in the Determine Sensing Request received from the AF.

Step 306: In order to collect the sensing data from the NG-RAN nodes serving the TAI list, the Sensing NF sends a Sensing Resource Setup Request towards the AMF, to set up the Nx tunnel between the NG-RAN nodes and the Sensing NF. The Sensing Resource Setup Request may comprise address information (e.g., an internet protocol (IP) address and an IP port) of the Sensing NF. In an embodiment, the Sensing NF may further include a list of NG-RAN node identifiers and the sensing requirement or sensing instruction in the Sensing Resource Setup Request. In an embodiment, the Sensing NF acquires the list of NG-RAN node identifiers according to the TAI list.

Step 307: The AMF sends the Sensing Resource Setup Response to the Sensing NF. The Sensing Resource Setup Response may include the unavailable NG-RAN node identifiers.

Step 308: The AMF forwards the address information (e.g., IP address and the IP port) of the Sensing NF and the sensing requirement or sensing instruction to the NG-RAN node(s) indicated in step 307 in an N2 Transport message. The AMF includes a Routing identifier for identifying the Sensing NF in the N2 Transport message.

Step 309: The NG-RAN node returns address information (e.g., an IP address and an IP port) of the NG-RAN node to the AMF in an N2 Transport message. In an embodiment, the target NG-RAN node may also include the Routing identifier received in step 308 in the N2 Transport message.

Step 310: The AMF forwards the address information (e.g., the IP address and the IP port) of the NG-RAN node, in a Sensing Resource Setup Notify, to the Sensing NF indicated by the routing identifier received in step 309.

Step 311: The Sensing NF sends a Sensing Resource Setup Notify Response to the AMF.

Step 312: The NG-RAN node performs sensing measurements according to the sensing requirement or sensing instruction and obtains sensing data requested by the Sensing NF. Note that Step 312 can be performed after receiving the sensing requirement or sensing instruction, and the order of the steps is not limited to the embodiment described above.

Step 313: The NG-RAN node sends the sensing data to the Sensing NF over the Nx tunnel. In an embodiment, steps 312 and 313 may be repeated if the Sensing NF further exchanges sensing information with the NG-RAN node over the Nx tunnel.

In an embodiment, steps 308 to 313 are performed for each NG-RAN node, e.g., serving (tracking areas (TAs) associated with) the TAI list.

Step 314: The Sensing NF calculates sensing result(s) based on the sensing data received from the NG-RAN node(s) and sends the final sensing data (e.g., a calculated result) to the AMF.

Steps 315 and 316: The AMF sends a Sensing Report comprising the final sensing data to the external AF via the NEF.

In an embodiment of the AF being the internal AF, the AMF directly sends the Sensing Report comprising the final sensing data to the AF.

In an embodiment, an NR Positioning Protocol A (NRPPa) protocol between the Sensing NF and the NG-RAN node(s) is evolved to support the Nx interface.

In an embodiment, the routing identifier described above is used by the AMF to transmit sensing data from the NG-RAN(s) to a correct Sensing NF. For example, when two Sensing NFs, Sensing NF1 and Sensing NF2, simultaneously request sensing data from NG-RAN(s) through the AMF, in response to the requests from Sensing NF1 and Sensing NF2, the AMF immediately replies a response to Sensing NF1 and Sensing NF2, and these pairs of HTTP (Hypertext Transfer Protocol) requests and responses end. Subsequently, when the AMF received the sensing data from the NG-RAN(s) with routing identifiers corresponding to Sensing NF1 and Sensing NF2, the AMF reports the received sensing data to Sensing NF1 and Sensing NF2 through notify requests. Since the notify requests are brand new HTTP requests, the AMF needs the routing identifiers corresponding to Sensing NF1 and Sensing NF2 to identify the destination of the sensing data from the NG-RAN(s).

In some embodiments, more than one AMFs are selected by the NEF to perform the operations described above. In such a case, each AMF may serve a part of TA(s) in the TAI list. Thus, the disclosure is not limited to the embodiments described above.

Similarly, in some embodiments, more than one Sensing NFs are selected by the AMF(s) to perform the operations described above. In such a case, each Sensing NF may serve a part of TA(s) in the TAI list. Thus, the disclosure is not limited to the embodiments described above.

Figure 4:
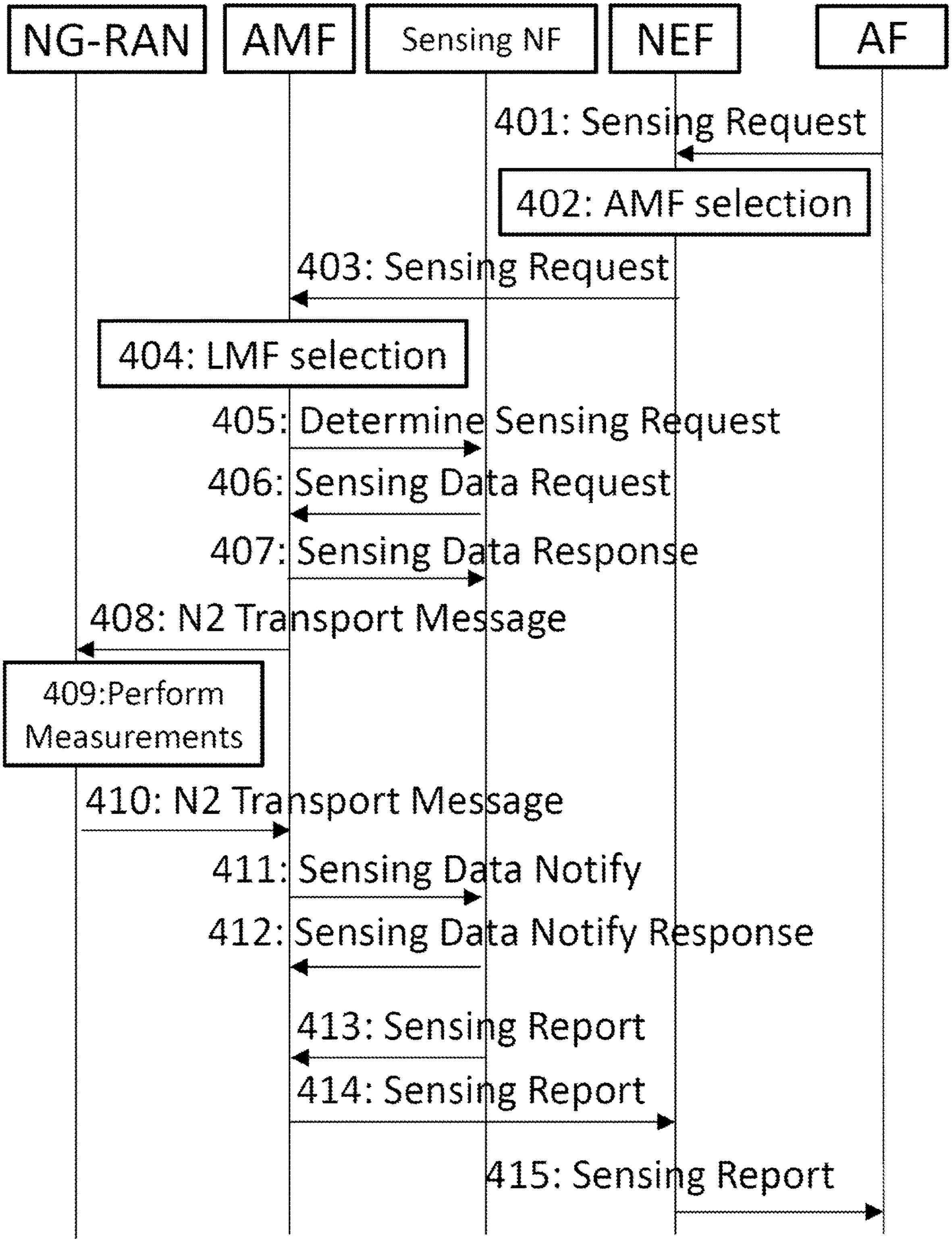
FIG. 4 shows a schematic diagram of a process according to an embodiment of the present disclosure.

FIG. 4 shows a schematic diagram of a process according to an embodiment of the present disclosure. In FIG. 4, the Sensing NF collects the sensing data from the NG-RAN via the AMF over the N2 interface. Particularly, the process shown in FIG. 4 comprises the following steps:

Step 401: In order to be aware of objects within an area, an external AF sends a Sensing Request for the area to the NEF. The Sensing Request includes the target area (e.g., a geographical area) and may further include at least one of a sensing quality of service (QOS), one or more object types (e.g., dynamic object or static object) and/or other attributes for sensing requirements.

In an embodiment of the AF being an internal AF, the internal AF may select the AMF and send the Sensing Request to the AMF directly. In this embodiment, the Sensing Request includes a target TAI list.

Step 402: The NEF determines whether the AF or the Sensing Request from the AF is authorized and maps the geographical area into a TAI list. If the AF or the Sensing Request is authorized, the NEF selects an AMF that serves the mapped TAI list.

Step 403: The NEF sends the Sensing Request comprising the TAI list to the selected AMF.

Step 404: The AMF selects a Sensing NF based on the TAI list. In an embodiment, the selection may be performed by using an NRF query.

Step 405: The AMF sends a Determine Sensing Request towards the Sensing NF, to request the sensing data corresponding to the TAI list. The AMF includes the TAI list in the Determine Sensing Request. In an embodiment, the AMF further includes, if available, at least one of the sensing quality of service (QOS), one or more object types (e.g., dynamic object or static object) and/or other attributes in the Determine Sensing Request received from the AF.

Step 406: In order to collect the sensing data from the NG-RAN nodes serving the TAI list, the Sensing NF sends the Sensing Data Request towards the AMF. The Sensing NF includes the list of NG-RAN node identifiers and the sensing requirement or sensing instruction in the Sensing Data Request. In an embodiment, the Sensing NF acquires the list of NG-RAN node identifiers according to the TAI list.

Step 407: The AMF sends the Sensing Data Response to the Sensing NF. The Sensing data Response may include the unavailable NG-RAN node identifiers.

Step 408: The AMF forwards the sensing requirement or sensing instruction, in an N2 Transport message, to the NG-RAN node(s) indicated in step 406. In an embodiment, the AMF further includes a Routing identifier identifying the Sensing NF in the N2 Transport message.

Step 409: The NG-RAN node performs sensing measurements and obtains sensing data requested by the Sensing NF.

Step 410: The NG-RAN node returns the sensing data to the AMF in an N2 Transport message. In an embodiment, the target NG-RAN node may also include the Routing identifier received in step 408 in the N2 Transport message.

Step 411: The AMF forwards the sensing data, in the Sensing Data Notify, to the Sensing NF indicated by the routing identifier which is received in step 410.

Step 412: The Sensing NF sends the Sensing Data Notify Response to the AMF. Note that steps 408 to 412 are performed for each NG-RAN node, e.g., serving (TAs associated with) the TAI list.

Step 413: The Sensing NF calculates the sensing result based on the sensing data received from the NG-RAN nodes and sends the final sensing data to the AMF.

Steps 414 and 415: The AMF sends the sensing report with the final sensing data (e.g., a calculated result) to the (external) AF via the NEF.

In an embodiment of the AF being an internal AF, the AMF sends the Sensing Report to the AF directly.

Details of the process in FIG. 4 can be ascertained by referring to embodiments described above, and will not be described herein.

In an embodiment of the present disclosure, the Sensing NF may perform at least one of:

1) Receiving the sensing request from the AMF.
2) Sending, to the NG-RAN via the AMF, the IP address and the IP port of the Sensing NF receiving the uplink data (sensing data) over the Nx tunnel.
3) Receiving, from the NG-RAN via the AMF, the IP address and the IP port of the NG-RAN receiving the downlink data (sensing request) over the Nx tunnel.
4) Requesting the sensing data from the NG-RAN via the AMF.
5) Requesting the sensing data from the NG-RAN via the Nx tunnel.
6) Receiving the sensing data from the NG-RAN via the AMF.
7) Receiving the sensing data from the NG-RAN via the Nx tunnel.
8) Calculating the sensing result based on the sensing data received from the NG-RAN.
9) Sending to the AMF the sensing report with the final sensing data.
10) Registering with the NRF the TAI list that the Sensing NF can serve.

In an embodiment of the present disclosure, the NEF may perform at least one of:

1) Mapping the target area (e.g., geographical area) indicated in the AF sensing request into a TAI list.
2) Authorizing the AF sensing request.
3) Selecting an AMF based on the TAI list.
4) Transferring the AF sensing request to the AMF.
5) Receiving the sensing data from the AMF and transferring the sensing data to the AF.

In an embodiment of the present disclosure, the AMF may perform at least one of:

1) Receiving the (AF) sensing request from the AF (via the NEF).
2) Selecting a Sensing NF via the NRF or local configuration based on the TAI list.
3) Sending the sensing request to the Sensing NF.
4) Receiving, from the Sensing NF, the IP address and the IP port of the Sensing NF receiving uplink data (sensing data) over the Nx tunnel.
5) Transferring, to the NG-RAN, the IP address and the IP port of the Sensing NF.

6) Receiving, from the NG-RAN, the IP address and the IP port of the NG-RAN receiving downlink data (sensing request) over the Nx tunnel.
7) Transferring, to the Sensing NF, the IP address and the IP port of the NG-RAN.
8) Transferring the sensing request received from the Sensing NF to the NG-RAN.
9) Transferring the sensing data received from the NG-RAN to the Sensing NF.
10) Receiving the sensing report from the Sensing NF and transferring the sensing data to the AF (via the NEF).

In an embodiment of the present disclosure, the NG-RAN (node) may perform at least one of:
1) Receiving, from the Sensing NF via the AMF, the IP address and the IP port of the Sensing NF receiving uplink data (sensing data) over the Nx tunnel.
2) Sending, to the Sensing NF via the AMF, the IP address and the IP port of the Sensing NF receiving downlink data (sensing request) over the Nx tunnel.
3) Receiving from the Sensing NF via the AMF the sensing request.
4) Performing sensing measurements and obtaining the sensing data requested by the Sensing NF.
5) Sending the sensing data to the Sensing NF via the Nx tunnel.
6) Sending the sensing data to the Sensing NF via the AMF.
7) Receiving, from the Sensing NF via the Nx tunnel, the sensing request.

Figure 5:
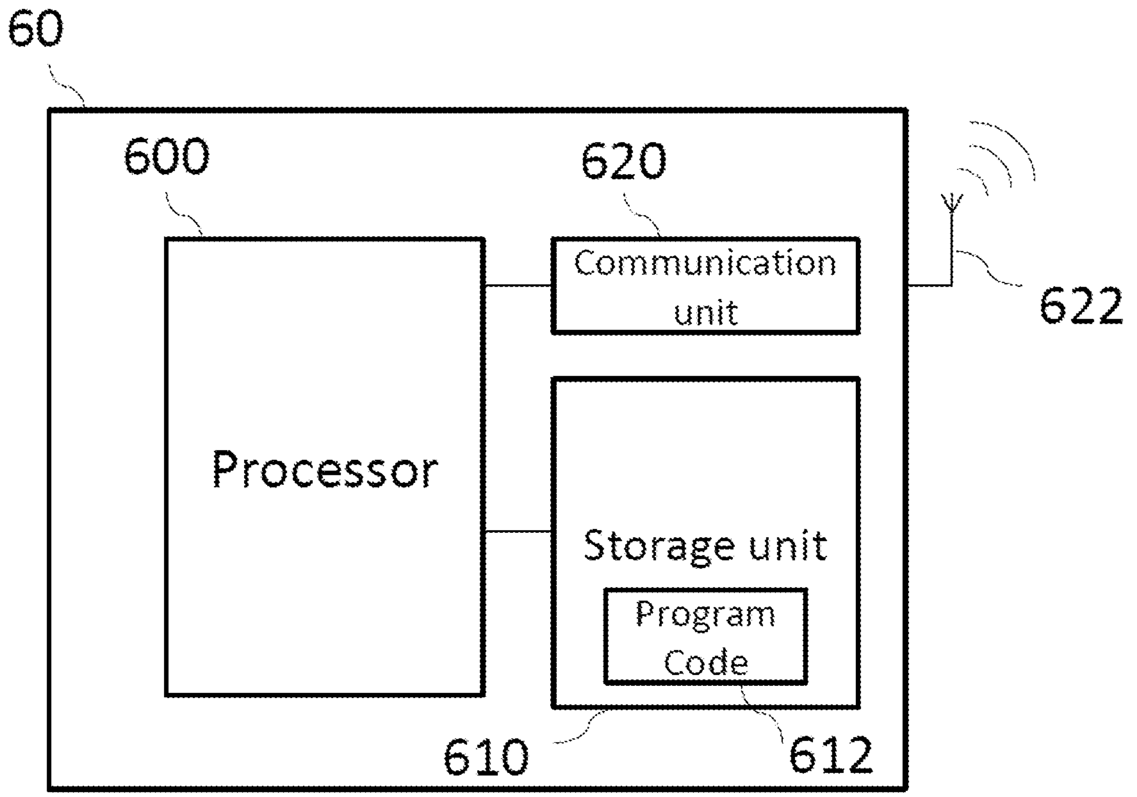
FIG. 5 shows an example of a schematic diagram of a wireless network node according to an embodiment of the present disclosure.

FIG. 5 relates to a schematic diagram of a wireless network node 60 according to an embodiment of the present disclosure. The wireless network node 60 may be a satellite, a base station (BS), a network entity, a Mobility Management Entity (MME), Serving Gateway (S-GW), Packet Data Network (PDN) Gateway (P-GW), a radio access network (RAN) node, a next generation RAN (NG-RAN) node, a gNB, an eNB, a gNB central unit (gNB-CU), a gNB distributed unit (gNB-DU) a data network, a core network or a Radio Network Controller (RNC), and is not limited herein. In addition, the wireless network node 60 may comprise (perform at least part of functionalities of) at least one network function such as an access and mobility management function (AMF), a session management function (SMF), a user place function (UPF), a policy control function (PCF), an application function (AF), Sensing NF, network exposure function (NEF), etc. The wireless network node 60 may include a processor 600 such as a microprocessor or ASIC, a storage unit 610 and a communication unit 620. The storage unit 610 may be any data storage device that stores a program code 612, which is accessed and executed by the processor 600. Examples of the storage unit 612 include but are not limited to a SIM, ROM, flash memory, RAM, hard-disk, and optical data storage device. The communication unit 620 may be a transceiver and is used to transmit and receive signals (e.g., messages or packets) according to processing results of the processor 600. In an example, the communication unit 620 transmits and receives the signals via at least one antenna 622 shown in FIG. 5.

In an embodiment, the storage unit 610 and the program code 612 may be omitted. The processor 600 may include a storage unit with stored program code.

The processor 600 may implement any steps described in exemplified embodiments on the wireless network node 60, e.g., via executing the program code 612.

The communication unit 620 may be a transceiver. The communication unit 620 may as an alternative or in addition be combining a transmitting unit and a receiving unit configured to transmit and to receive, respectively, signals to and from a wireless terminal (e.g., a user equipment or another wireless network node).

A wireless communication method is also provided according to an embodiment of the present disclosure. In an embodiment, the wireless communication method may be performed by using a wireless communication node (e.g., an AMF). In an embodiment, the wireless communication node may be implemented by using the wireless communication node 60 described above, but is not limited thereto.

In an embodiment, the wireless communication method includes: receiving, by an access and mobility management node from a sensing network node, a first message and one or more identifiers of one or more target access network nodes; transmitting, by the access and mobility management node to the target access network nodes, the first message according to the one or more identifiers of target access network nodes to request the target access network nodes to generate sensing data, wherein the sensing data is transmitted to the sensing network node; and receiving, by the access and mobility management node from the sensing network node, a calculated result according to the sensing data.

In an embodiment, the first message can be the Sensing Resource Setup Notify or the Sensing Data Request described above, but is not limited thereto. In an embodiment, the target access network nodes may be the NG-RANs described above, but is not limited thereto.

Details in this regard can be ascertained with reference to the paragraphs above, and will not be repeated herein.

Another wireless communication method is also provided according to an embodiment of the present disclosure. In an embodiment, the wireless communication method may be performed by using a wireless communication node (e.g., a Sensing NF). In an embodiment, the wireless communication node may be implemented by using the wireless communication node 60 described above, but is not limited thereto.

In an embodiment, the wireless communication method includes: transmitting, by a sensing network node to an access and mobility management node, a first message and one or more identifiers of one or more target access network nodes, to request the access and mobility management node to forward the first message to the target access network nodes according to the one or more identifiers, to request the target access network nodes to generate sensing data; receiving, by the sensing network node, the sensing data; and transmitting, by the sensing network node to the access and mobility management node, a calculated result according to the sensing data.

Details in this regard can be ascertained with reference to the paragraphs above, and will not be repeated herein.

Another wireless communication method is also provided according to an embodiment of the present disclosure. In an embodiment, the wireless communication method may be performed by using a wireless communication node (e.g., an NG-RAN node). In an embodiment, the wireless communication node may be implemented by using the wireless communication node 60 described above, but is not limited thereto.

In an embodiment, the wireless communication method includes: receiving, by an access network node from an access and mobility management node, a first message; performing, by the access network node, measurements to generate sensing data according to the first message; and transmitting, by the access network node, the sensing data to a sensing network node to allow the sensing network node to generate a calculated result according to the sensing data.

Details in this regard can be ascertained with reference to the paragraphs above, and will not be repeated herein.

Another wireless communication method is also provided according to an embodiment of the present disclosure. In an embodiment, the wireless communication method may be performed by using a wireless communication node (e.g., an NEF). In an embodiment, the wireless communication node may be implemented by using the wireless communication node 60 described above, but is not limited thereto.

In an embodiment, the wireless communication method includes: transmitting, by a network exposure node to an access and mobility management node, a first sensing request, to allow the access and mobility management node to trigger a sensing network node to acquire sensing data from one or more target access network nodes; and receiving, by the network exposure node from the access and mobility management node, a calculated result according to the sensing data.

In an embodiment, the network exposure node is configured to receive a second sensing request from an application node and determine whether the second sensing request from the application node is authorized.

In an embodiment, the first sensing request may be the Sensing Request from the NEF to the AMF described above, but is not limited thereto. In an embodiment, the second request may be the Sensing Request from the AF to the NEF described above, but is not limited thereto.

Details in this regard can be ascertained with reference to the paragraphs above, and will not be repeated herein.

While various embodiments of the present disclosure have been described above, it should be understood that they have been presented by way of example only, and not by way of limitation. Likewise, the various diagrams may depict an example architectural or configuration, which are provided to enable persons of ordinary skill in the art to understand example features and functions of the present disclosure. Such persons would understand, however, that the present disclosure is not restricted to the illustrated example architectures or configurations, but can be implemented using a variety of alternative architectures and configurations. Additionally, as would be understood by persons of ordinary skill in the art, one or more features of one embodiment can be combined with one or more features of another embodiment described herein. Thus, the breadth and scope of the present disclosure should not be limited by any one of the above-described example embodiments.

It is also understood that any reference to an element herein using a designation such as "first," "second," and so forth does not generally limit the quantity or order of those elements. Rather, these designations can be used herein as a convenient means of distinguishing between two or more elements or instances of an element. Thus, a reference to first and second elements does not mean that only two elements can be employed, or that the first element must precede the second element in some manner.

Additionally, a person having ordinary skill in the art would understand that information and signals can be represented using any one of a variety of different technologies and techniques. For example, data, instructions, commands, information, signals, bits and symbols, for example, which may be referenced in the above description can be represented by voltages, currents, electromagnetic waves, magnetic fields or particles, optical fields or particles, or any combination thereof.

A skilled person would further appreciate that any one of the various illustrative logical blocks, units, processors, means, circuits, methods and functions described in connection with the aspects disclosed herein can be implemented by electronic hardware (e.g., a digital implementation, an analog implementation, or a combination of the two), firmware, various forms of program or design code incorporating instructions (which can be referred to herein, for convenience, as "software" or a "software unit"), or any combination of these techniques.

To clearly illustrate this interchangeability of hardware, firmware and software, various illustrative components, blocks, units, circuits, and steps have been described above generally in terms of their functionality. Whether such functionality is implemented as hardware, firmware or software, or a combination of these techniques, depends upon the particular application and design constraints imposed on the overall system. Skilled artisans can implement the described functionality in various ways for each particular application, but such implementation decisions do not cause a departure from the scope of the present disclosure. In accordance with various embodiments, a processor, device, component, circuit, structure, machine, unit, etc. can be configured to perform one or more of the functions described herein. The term "configured to" or "configured for" as used herein with respect to a specified operation or function refers to a processor, device, component, circuit, structure, machine, unit, etc. that is physically constructed, programmed and/or arranged to perform the specified operation or function.

Furthermore, a skilled person would understand that various illustrative logical blocks, units, devices, components and circuits described herein can be implemented within or performed by an integrated circuit (IC) that can include a general purpose processor, a digital signal processor (DSP), an application specific integrated circuit (ASIC), a field programmable gate array (FPGA) or other programmable logic device, or any combination thereof. The logical blocks, units, and circuits can further include antennas and/or transceivers to communicate with various components within the network or within the device. A general purpose processor can be a microprocessor, but in the alternative, the processor can be any conventional processor, controller, or state machine. A processor can also be implemented as a combination of computing devices, e.g., a combination of a DSP and a microprocessor, a plurality of microprocessors, one or more microprocessors in conjunction with a DSP core, or any other suitable configuration to perform the functions described herein. If implemented in software, the functions can be stored as one or more instructions or code on a computer-readable medium. Thus, the steps of a method or algorithm disclosed herein can be implemented as software stored on a computer-readable medium.

Computer-readable media includes both computer storage media and communication media including any medium that can be enabled to transfer a computer program or code from one place to another. A storage media can be any available media that can be accessed by a computer. By way of example, and not limitation, such computer-readable media can include RAM, ROM, EEPROM, CD-ROM or other optical disk storage, magnetic disk storage or other magnetic storage devices, or any other medium that can be used to store desired program code in the form of instructions or data structures and that can be accessed by a computer.

In this document, the term "unit" as used herein, refers to software, firmware, hardware, and any combination of these elements for performing the associated functions described herein. Additionally, for purpose of discussion, the various units are described as discrete units; however, as would be apparent to one of ordinary skill in the art, two or more units may be combined to form a single unit that performs the associated functions according to embodiments of the present disclosure.

Additionally, memory or other storage, as well as communication components, may be employed in embodiments of the present disclosure. It will be appreciated that, for clarity purposes, the above description has described embodiments of the present disclosure with reference to different functional units and processors. However, it will be apparent that any suitable distribution of functionality between different functional units, processing logic elements or domains may be used without detracting from the present disclosure. For example, functionality illustrated to be performed by separate processing logic elements, or controllers, may be performed by the same processing logic element, or controller. Hence, references to specific functional units are only references to a suitable means for providing the described functionality, rather than indicative of a strict logical or physical structure or organization.

Various modifications to the implementations described in this disclosure will be readily apparent to those skilled in the art, and the general principles defined herein can be applied to other implementations without departing from the scope of claims. Thus, the disclosure is not intended to be limited to the implementations shown herein, but is to be accorded the widest scope consistent with the novel features and principles disclosed herein, as recited in the claims below.

The invention claimed is:

1. A wireless communication method comprising:

receiving, by an access and mobility management node from a sensing network node, a first message, comprising address information of the sensing network node, and one or more identifiers of one or more target access network nodes;

transmitting, by the access and mobility management node to the one or more target access network nodes, the first message with a routing identifier of the sensing network node according to the one or more identifiers of the one or more target access network nodes to request the one or more target access network nodes to generate sensing data;

receiving, by the access and mobility management node from the one or more target access network nodes, address information of the one or more target access network nodes with the routing identifier;

transmitting, by the access and mobility management node to the sensing network node, the address information of the one or more target access network nodes according to the routing identifier, wherein the sensing data is transmitted to the sensing network node via one or more tunnels based on the address information of the sensing network node and the address information of the one or more target access network nodes; and receiving, by the access and mobility management node from the sensing network node, a calculated result according to the sensing data.

2. The wireless communication method of claim 1, wherein the sensing data is transmitted to the sensing network node via the one or more tunnels between the sensing network node and each of the one or more target access network nodes, and wherein the address information of the sensing network node comprises an Internet Protocol (IP) address and an IP port.

3. The wireless communication method of claim 1, wherein the access and mobility management node is configured to receive the sensing data and transmit the sensing data to the sensing network node; and wherein the access and mobility management node is configured to transmit the first message with the routing identifier of the sensing network node to the one or more target access network nodes, receive the sensing data with the routing identifier, and transmit the sensing data to the sensing network node according to the routing identifier.

4. The wireless communication method of claim 1, wherein the access and mobility management node is configured to receive a sensing request comprising a tracking area identity (TAI) list.

5. The wireless communication method of claim 1, wherein the access and mobility management node is configured to select the sensing network node according to a tracking area identity (TAI) list and transmit the TAI list to the sensing network node.

6. The wireless communication method of claim 1, wherein the access and mobility management node is configured to transmit to the sensing network node at least one of a sensing quality of service (QoS) or one or more object types.

7. The wireless communication method of claim 1, wherein the access and mobility management node is configured to transmit information of one or more unavailable access network nodes to the sensing network node.

8. The wireless communication method of claim 1, wherein the access and mobility management node is configured to transmit the calculated result to a network exposure node or an application node.

9. A wireless communication method comprising:

transmitting, by a sensing network node to an access and mobility management node, a first message, comprising address information of the sensing network node, and one or more identifiers of one or more target access network nodes, to request the access and mobility management node to forward the first message to the one or more target access network nodes according to the one or more identifiers with a routing identifier of the sensing network node, to request the one or more target access network nodes to generate sensing data;

receiving, by the sensing network node from the access and mobility management node, address information of the one or more target access network nodes according to the routing identifier;

receiving, by the sensing network node, the sensing data via one or more tunnels based on the address information of the sensing network node and the address information of the one or more target access network nodes; and transmitting, by the sensing network node to the access and mobility management node, a calculated result according to the sensing data.

10. The wireless communication method of claim 9, wherein the sensing data is received by the sensing network node via the one or more tunnels between the sensing network node and each of the one or more target access network nodes, and wherein the address information of the sensing network node comprises an Internet Protocol (IP) address and an IP port.

11. The wireless communication method of claim 9, wherein the sensing data is received by the sensing network node via the access and mobility management node.

12. The wireless communication method of claim 9, wherein the sensing network node is configured to receive a tracking area identity (TAI) list from the access and mobility management node, and determine the one or more identifiers of the one or more target access network nodes according to the TAI list.

13. The wireless communication method of claim 9, wherein the sensing network node is configured to receive, from the access and mobility management node, at least one of a sensing quality of service (QoS) or one or more object types.

14. The wireless communication method of claim 9, wherein the sensing network node is configured to receive information of one or more unavailable access network nodes from the access and mobility management node.

15. A wireless communication method comprising:

receiving, by an access network node from an access and mobility management node, a first message, comprising address information of a sensing network node, with a routing identifier of the sensing network node, wherein the access network node is configured to transmit address information of the access network node with the routing identifier of the sensing network node via the access and mobility management node;

performing, by the access network node, measurements to generate sensing data according to the first message; and transmitting, by the access network node, the sensing data to the sensing network node via a tunnel based on the address information of the sensing network node and the address information of the access network node according to the routing identifier to allow the sensing network node to generate a calculated result according to the sensing data.

16. The wireless communication method of claim 15, wherein the sensing data is transmitted to the sensing network node via the tunnel between the sensing network node and the access network node, and wherein the address information of the sensing network node comprises an Internet Protocol (IP) address and an IP port.

17. The wireless communication method of claim 15, wherein the access network node is configured to transmit the sensing data to the sensing network node via the access and mobility management node; and wherein the access network node is configured to receive the first message with the routing identifier of the sensing network node and transmit the sensing data with the routing identifier to the access and mobility management node, to allow the access and mobility management node to transmit the sensing data to the sensing network node according to the routing identifier.

* * * * *